United States Patent
Bambardekar et al.

(10) Patent No.: US 6,175,078 B1
(45) Date of Patent: Jan. 16, 2001

(54) FLUSH POKE-THROUGH WIRING FITTING HAVING A HEIGHT ADJUSTABLE DATA JACK MOUNTING BRACKET

(75) Inventors: Shailesh Shashikant Bambardekar, Vienna, WV (US); Amy Chaffee Hatfield, Ashland, OH (US)

(73) Assignee: Walker Systems, Inc., Williamstown, WV (US)

( * ) Notice: Under 35 U.S.C. 154(b), the term of this patent shall be extended for 0 days.

(21) Appl. No.: 09/201,492

(22) Filed: Nov. 30, 1998

(51) Int. Cl.⁷ ........................................................ H02G 3/14
(52) U.S. Cl. ................................. 174/48; 174/66; 52/220.8
(58) Field of Search ................................. 174/48, 66, 57; 52/220.8; 220/241, 3.8

(56) References Cited

U.S. PATENT DOCUMENTS

| | | |
|---|---|---|
| 2,042,633 | 6/1936 | Richardson . |
| 3,359,359 | 12/1967 | Beck et al. . |
| 3,433,886 * | 3/1969 | Myers ..................................... 174/57 |
| 3,620,404 * | 11/1971 | Grasso ................................. 174/48 X |
| 3,646,244 * | 2/1972 | Cole ........................................ 174/57 |
| 3,751,576 | 8/1973 | Klinkman et al. . |
| 3,814,834 * | 6/1974 | Glader ..................................... 174/57 |
| 3,932,696 | 1/1976 | Fork et al. . |
| 3,995,102 | 11/1976 | Kohaut . |
| 4,099,020 | 7/1978 | Kohaut . |
| 4,245,445 | 1/1981 | Heinen . |
| 4,270,318 | 6/1981 | Carroll et al. . |
| 4,272,643 | 6/1981 | Carroll et al. . |
| 4,364,210 | 12/1982 | Fleming et al. . |
| 4,443,654 * | 4/1984 | Flachbarth et al. ................. 174/57 X |
| 4,467,577 | 8/1984 | Licht . |
| 4,577,055 | 3/1986 | Wuertz . |
| 4,612,412 | 9/1986 | Johnston . |
| 4,767,181 | 8/1988 | McEowen . |
| 4,770,643 | 9/1988 | Castellani et al. . |
| 4,879,435 | 11/1989 | Domigan . |
| 4,993,970 | 2/1991 | Littrell . |
| 5,012,043 * | 4/1991 | Seymour ................................. 174/57 |
| 5,023,396 * | 6/1991 | Bartee et al. ....................... 174/57 X |
| 5,114,365 * | 5/1992 | Thompson et al. ................. 174/66 X |
| 5,195,288 | 3/1993 | Penczak . |
| 5,220,131 | 6/1993 | Wuertz . |
| 5,223,673 * | 6/1993 | Mason ................................ 174/57 X |
| 5,272,278 | 12/1993 | Wuertz . |
| 5,305,380 | 4/1994 | Hileman et al. . |
| 5,350,884 | 9/1994 | Littrell . |
| 5,383,567 | 1/1995 | Sorathia et al. . |
| 5,393,930 | 2/1995 | Wuertz . |
| 5,410,103 | 4/1995 | Wuertz . |
| 5,486,650 | 1/1996 | Yetter . |
| 5,594,201 * | 1/1997 | Reinert, Sr. ......................... 174/48 X |
| 5,598,670 * | 2/1997 | Humphrey et al. ................. 52/220.8 |
| 5,627,340 | 5/1997 | Smith et al. . |
| 5,770,817 * | 6/1998 | Lo .......................................... 174/57 |

FOREIGN PATENT DOCUMENTS

| | | |
|---|---|---|
| 384 671 | 2/1965 | (CH) . |
| 0 648 001 A2 | 4/1995 | (EP) . |
| 0881729 A2 | 12/1998 | (EP) . |
| 56-159919 | 9/1981 | (JP) . |

\* cited by examiner

*Primary Examiner*—Dean A. Reichard
(74) *Attorney, Agent, or Firm*—McAndrews, Held & Malloy

(57) ABSTRACT

An in-floor, flush poke-through wiring fitting may be installed in the floor of a structure to enable the activation of power, communication, and/or data services at the fitting location. The poke-through fitting includes a height adjustable mounting bracket that provides for internal mounting of a variety of different low voltage data jacks (e.g. fiber optic, RJ-45 Category 5, coaxial, etc.). The mounting bracket includes a first portion that is mountable in the finish ring over an internal chamber of the poke-through fitting. The data jack is mounted in a second portion of the mounting bracket that is mountable in the bracket first portion in a height adjustable manner, whereby the height of the bracket second portion may be adjusted relative to top assembly to accommodate service connectors of varying heights.

12 Claims, 5 Drawing Sheets

FLUSH POKE-THROUGH WIRING FITTING HAVING A HEIGHT ADJUSTABLE DATA JACK MOUNTING BRACKET

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates generally to in-floor, flush poke-through wiring or service fittings for enabling activation of power and low-voltage data services (e.g., video, telecommunication, computer network, etc.) at the in-floor locations of the fittings. More particularly, the present invention relates to flush poke-through wiring fittings that can accommodate a variety of low-voltage service connectors in an internally mounted, protected fashion.

Poke-through fittings are utilized to enable the activation of power and low-voltage services at the poke-through fitting's location. As explained in U.S. Pat. No. 4,770,643, high-voltage power cables and low-voltage signal cables, positioned in a plenum between the ceiling of the floor below and the floor above (that is, the floor in which the opening is in), may be pulled from the plenum and connected with or passed through the poke-through fitting for activation of services for and on the floor above. More specifically, high voltage source power cables are connected with power receptacles that may be mounted within the poke-through fitting or surface mounted on the floor above the fitting. Lower voltage service cables have been traditionally passed through the poke-through fitting to provide above floor connections between these cables and equipment positioned on the floor above.

It is desirable to have all of the service connectors contained within the floor box to provide a clean appearance and prevent tripping and/or damage to connectors fittings. U.S. patent application Ser. No. 09/098,797 which was filed on Jun. 17, 1998 by Norman Castelanni et al. and is entitled Flush Poke-Through Wire Fitting (hereinafter the "Castelanni et al. application) recognizes this problem and provides for internal mounting of industry standard RJ-45 Category 5 data jacks. However, because there are many styles of data jacks commercially available, there is a need for a poke-through fitting that provides for internal mounting of different styles of data jacks.

BRIEF SUMMARY OF THE INVENTION

The improved flush poke-through fitting of this invention overcomes the above problem and additionally provides commercially significant advantages as compared with the prior poke-through fittings. The invention comprises an improved, flush poke-through fitting that enables internal mounting of different styles of data jacks or connectors (e.g., fiber optics connectors, coaxial connectors and RJ-XX series connectors, including, but not limited to, RJ-11, RJ-12 and RJ-45 connectors) at the poke-through fitting's location. The poke-through utilizes a novel mounting bracket that is readily modifiable to support a variety of styles of data connectors in an internal, protected fashion. The mounting bracket has a first portion that is mountable in the top assembly of the poke-through fitting so that the bracket first portion overlies an internal chamber of the poke-through fitting. A second portion of the mounting bracket carries the data jack and is mountable in the bracket first portion in a height adjustable manner so that data connectors of differing heights may be internally mounted within the fitting. The top assembly includes a cover plate that overlies the mounting brackets. The cover plate has sliders that may be slid outwardly to provide access to the power receptacles and data connectors carried by the mounting brackets. The sliders have recessed portions that accommodate labels for identifying the data connectors contained in the fitting. In one embodiment, the mounting bracket is adapted to support at least one fiber optic connector in the chamber such that the top surface of the connector is recessed below the cover plate in a protected fashion the upper outwardly facing surface of the top assembly.

DETAILED DESCRIPTION OF THE PREFERRED EMBODIMENT OF THE INVENTION

Figure 1:
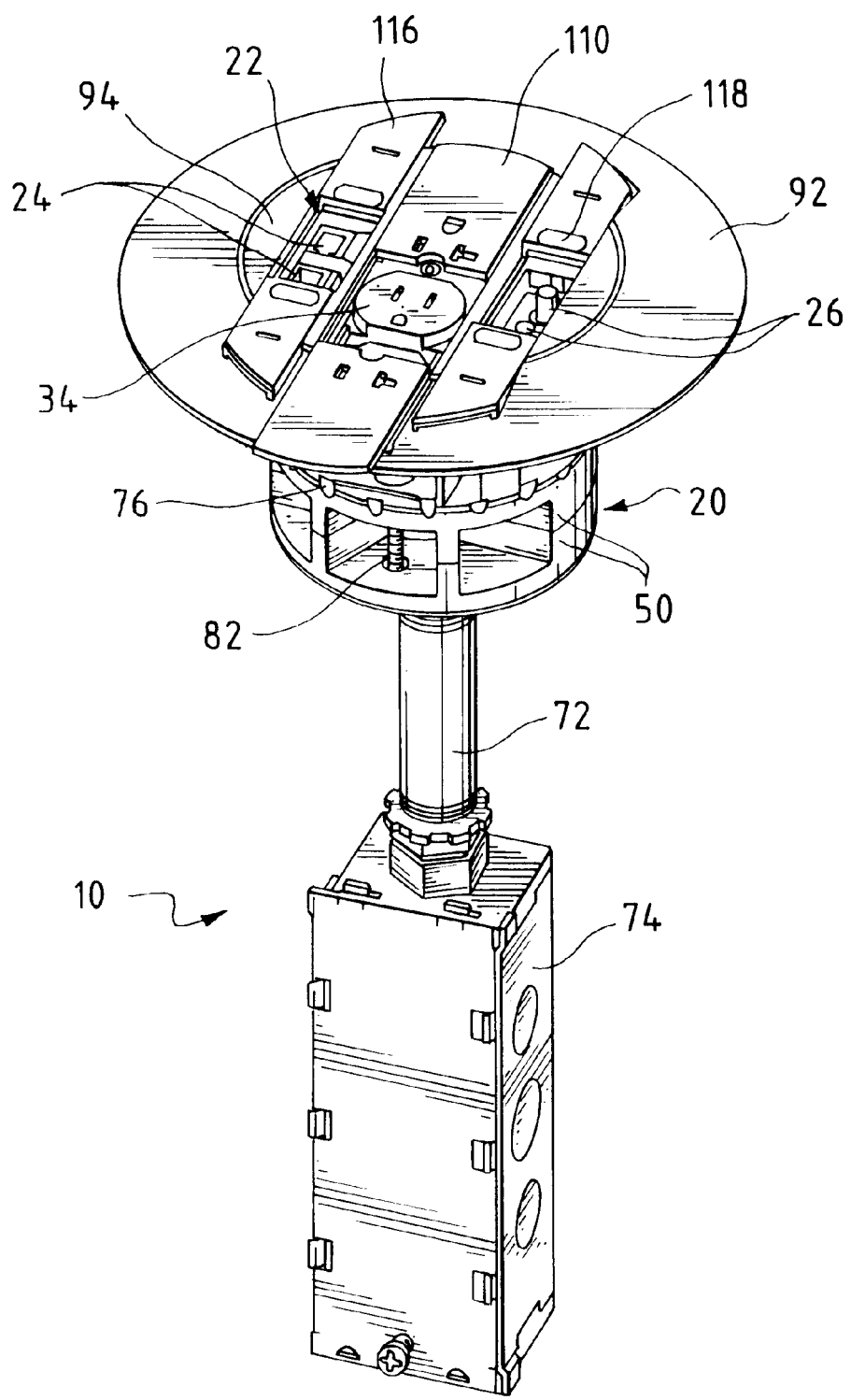
FIG. 1 is a perspective view of a poke-through fitting incorporating a height adjustable mounting bracket in accordance with the present invention.
Figure 2:
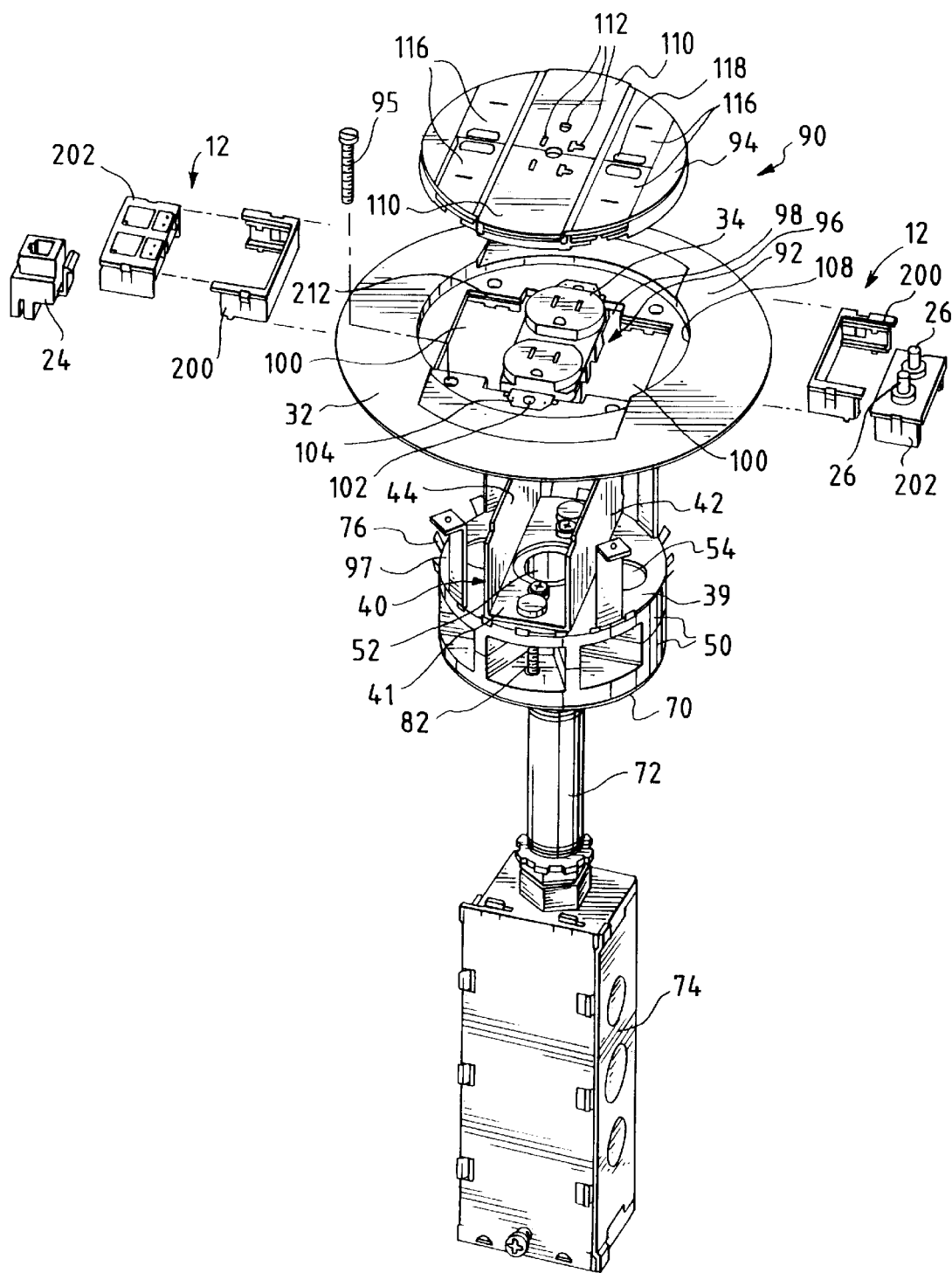
FIG. 2 is a partially exploded, perspective view of the improved poke-through of FIG. 1.
Figure 3:
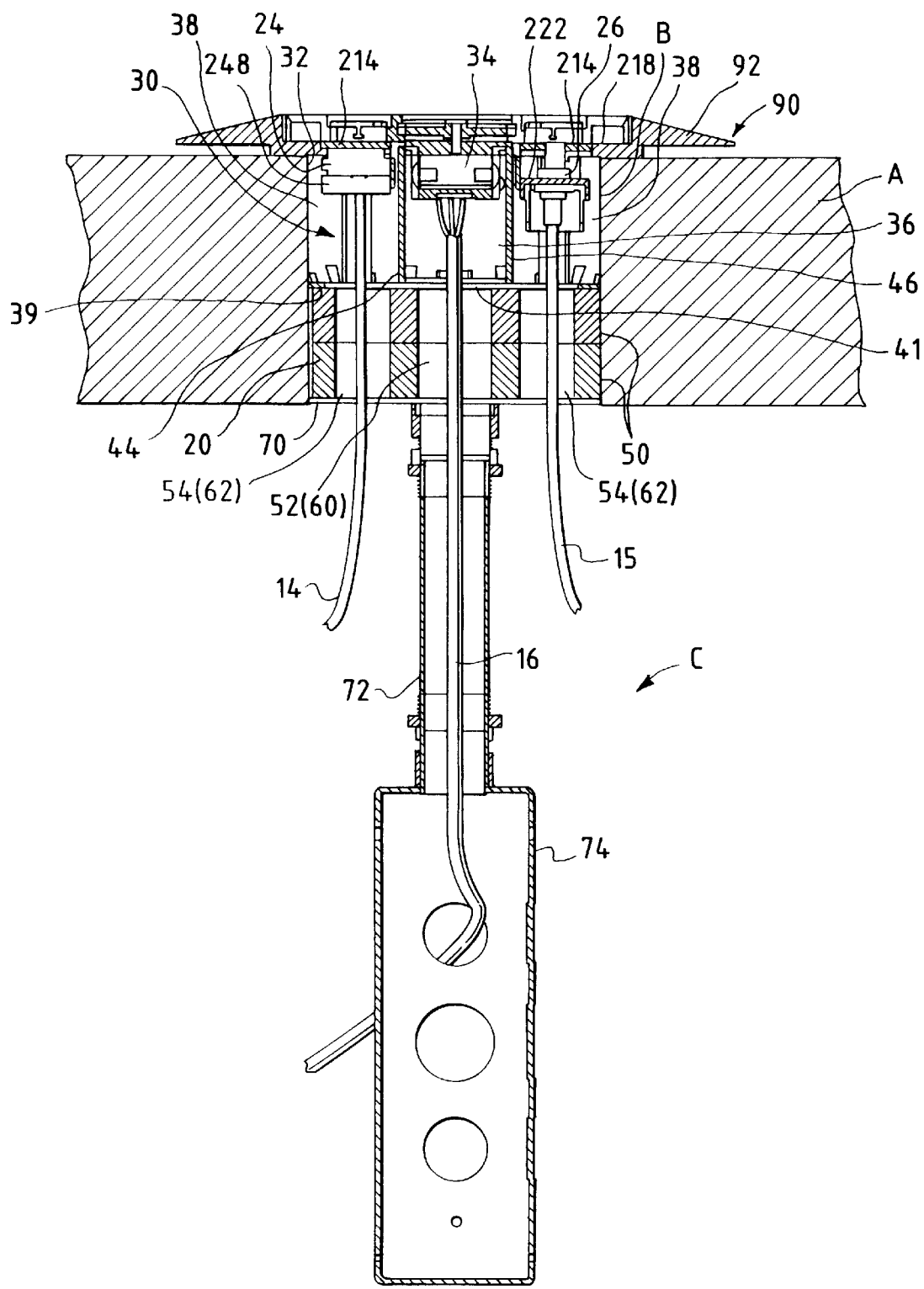
FIG. 3 is an cross-sectional view of the improved poke-through of FIG. 1.

FIGS. 1–3 illustrate a flush poke-through fitting 10 incorporating a height adjustable mounting bracket 12 in accordance with the present invention. Except for the mounting bracket 12 and certain aspects of the cover plate 94, the poke-through fitting 10 is generally similar to the one described in the aforementioned Castelanni et al. application, the disclosure of which is hereby incorporated by reference.

The poke-through fitting 10 is adapted to be connected to and to be activated by source signal service cables including low-voltage (communication and/or data) service cables 14, 15, and by power source service cables 16 (see FIG. 3).

The poke-through fitting 10 is adapted to be installed in a fire-rated floor A of a building, such as a commercial office building. More specifically, the poke-through fitting 10 may be installed in a circular opening B formed in floor A to activate a desired floor location. It is adapted to be activated by connecting source power service and signal service cables, which are otherwise disposed in the plenum C below the floor A, to fittings such as power receptacles and data jacks, respectively, mounted internally in the poke-through fitting 10. This enables above-floor A power plugs and signal transferring devices to be connected the poke-through fitting 10 and to thus transfer power and communication and/or data signals to equipment located on or above the floor A.

The poke-through fitting 10 comprises an insert 20 that is adapted to be installed in a floor opening B. The insert 20 has a plurality (four in the illustrated embodiment) of low-voltage service connectors or jacks 22 that are adapted to be activated within the fitting 10 by low-voltage source signal service cables 14, 15. Terminals in the upper faces of the jacks 22 are accessible through sliders 116 in the cover plate 94. In the illustrated embodiment, the fitting 10 includes two RJ-45 category 5 jacks 24 and two fiber optic jacks 26.

Insert 20 includes an upper, generally cylindrical chamber 30, which is defined at the insert's upper end by a horizontally disposed top plate 32 and at its lower end by a horizontally disposed middle plate 39. (In the illustrated embodiment, the top plate 32 is defined by the finishing ring 92.) The power receptacle 34 is adapted to be interconnected within the upper chamber 30 to the power service cables 16 for activation of power service in conventional manner. As hereinafter described and as shown in FIG. 1, the upper chamber 30 is divided into a central space or portion 36, in which the power receptacle 34 is disposed, and radially outer, semi-annular or side spaces or portions 38 in which the low-voltage signal jacks 22 are disposed.

Insert 20 includes an E.M.I. and/or R.F.I. barrier 40 mounted in the upper chamber 30. The barrier 40 separates and electrically isolates the source power service cables 16 from the source signal service cables 14, 15 in the chamber 30 so as to shield the source signal service cables, and their associated jacks 22, from E.M.I. and/or R.F.I. emanating from the source power service cables. More specifically, and as shown in FIGS. 1 and 3, the barrier 40 is generally U-shaped and includes a lower plate 41 and a pair of upstanding side plates 42 and 44. The side plates 42, 44 are disposed in a generally parallel manner, adjacent to the sides of the power receptacle 34. The side plates 42, 44 extend across the chamber 30 like chords and serve to divide the center space 36 from the side spaces 38. The barrier 40 shields the radially outer spaces 38, where the low-voltage source signal services cables are connected to the low-voltage signal jacks 22, from the central space 36, where the power source service cable is connected to the receptacle 34.

The barrier 40 is comprised of a material having a dielectric sufficient to isolate the end of the source power service cable from the ends of the source signal service cables. This material may comprise a polycarbonate polymer. The barrier 40 may also include a layer of conventional E.M.I. barrier material and conventional R.F.I. barrier material on the one side surfaces of plates 41, 42 and 44. The barrier 40 may be grounded to drain E.M.I. and R.F.I., which may be generated in insert 20, with respect to the chamber 30. More particularly, and as shown in FIG. 2, the barrier 40 is electrically connected, via a metallic fastener 82, such as a rivet or bolt, to a horizontally disposed bottom plate 70, which is grounded as explained below.

Insert 20 further includes two fire stopping elements 50, comprised intumescent material such as hydrated sodium silicate. The elements 50 forms in insulating barrier to control temperature increases and retard the spread of flames. The elements 50 further protect against heat and flame by forming a refractory char as the temperature continues to rise. The details of the intumescent material and more fully described in the aforementioned Castelanni application.

The fire stopping elements 50 each include a central, hollow space 52 that defines and forms a central raceway 60 through which the source power service cables 16 are extendable. The elements 50 similarly include two side hollow spaces 54 that define and form two side raceways 62 through which the source signal service cables 14, 15 are extendable.

The fire stopping elements 50 are supported between the middle plate 39 and the bottom plate 70. The middle and bottom plates 39, 70 have openings 64 which are aligned with the raceways 62 and 60 in the elements 50 to permit wires to pass between the plenum C and the upper chamber 30.

The upper end of a conventional electrical metalized tubing (EMT) connector 72 may be connected to the plate 70 for securing a conduit system thereto and for improving grounding capability. A conventional junction box 74 may be connected to the lower end of the connector 72. The junction box 74 may include a terminal (not shown) for connection of the source power service cable(s) in the plenum C to the box.

Insert 20 also includes a conventional annular retainer 76 which is disposed adjacent the middle plate 39. The retainer 76 retains the poke-through fitting 10 in floor opening B. As stated above, at least one fastener 82 extends between and is connected between the plates 39 and 70 for assisting in securing the fire stopping elements 50 between the plates, and as noted, to facilitate grounding of the barrier 40.

The poke-through fitting 10 further includes a top assembly 90 which is connected with the upper end of the insert and which overlies the floor opening B. The top assembly 90 includes a carpet flange or finish ring 92 that is preferably made from aluminum and a cover plate 94 that is preferably made from a suitable polymeric material, e.g. plastic. The finishing ring 92 is secured to the insert 20 by fasteners 95 extend through the finishing ring and thread into reciprocal openings in legs 97 that extend upwardly from the middle plate 39. The finish ring 92 has a central opening 96 that overlies the upper chamber 30 of the insert. The opening 96 is defined by a central opening 98 that overlies the central space 36 of the chamber 30 and two side openings 100 that overly the side spaces 38 of the chamber 30. It will be appreciated that the openings 98, 100 could also be formed by three separate openings in the finishing ring 92.

The central opening 98 is sized to receive and support the power receptacle 34. The receptacle 34 is secured in place by fasteners 102 that extend through brackets 104 formed on the receptacle 34 and thread into reciprocal openings in the finishing ring 92.

The cover plate 94 is generally circular and is sized to fit in a generally annular recess 108 formed in the top of the finish ring 92. The cover plate 94 includes a first pair of sliders 110 that are positioned to overlay the receptacle 34. Slots 112 in the sliders 100 are alignable with corresponding blade receiving slots in the power receptacle 34. In use, the sliders 110 may be moved outwardly so that outlet slots 112 in the sliders 100 align with corresponding outlets slots in the power receptacle 34, to permit an electrical plug (not shown) to be connected to the receptacle 34 for activation of above floor A power services.

The subassembly 91 also has four data jack sliders 116 that are positioned to overlay the side spaces 38 of the chamber 30. The data jack sliders 116 are slidably movable between positions covering and uncovering the data jacks 22. Each slider 116 includes a recessed portion 118. Labels may be placed in the recessed portions 118 to identify the data jacks 22 carried by the brackets 200.

Figure 4:
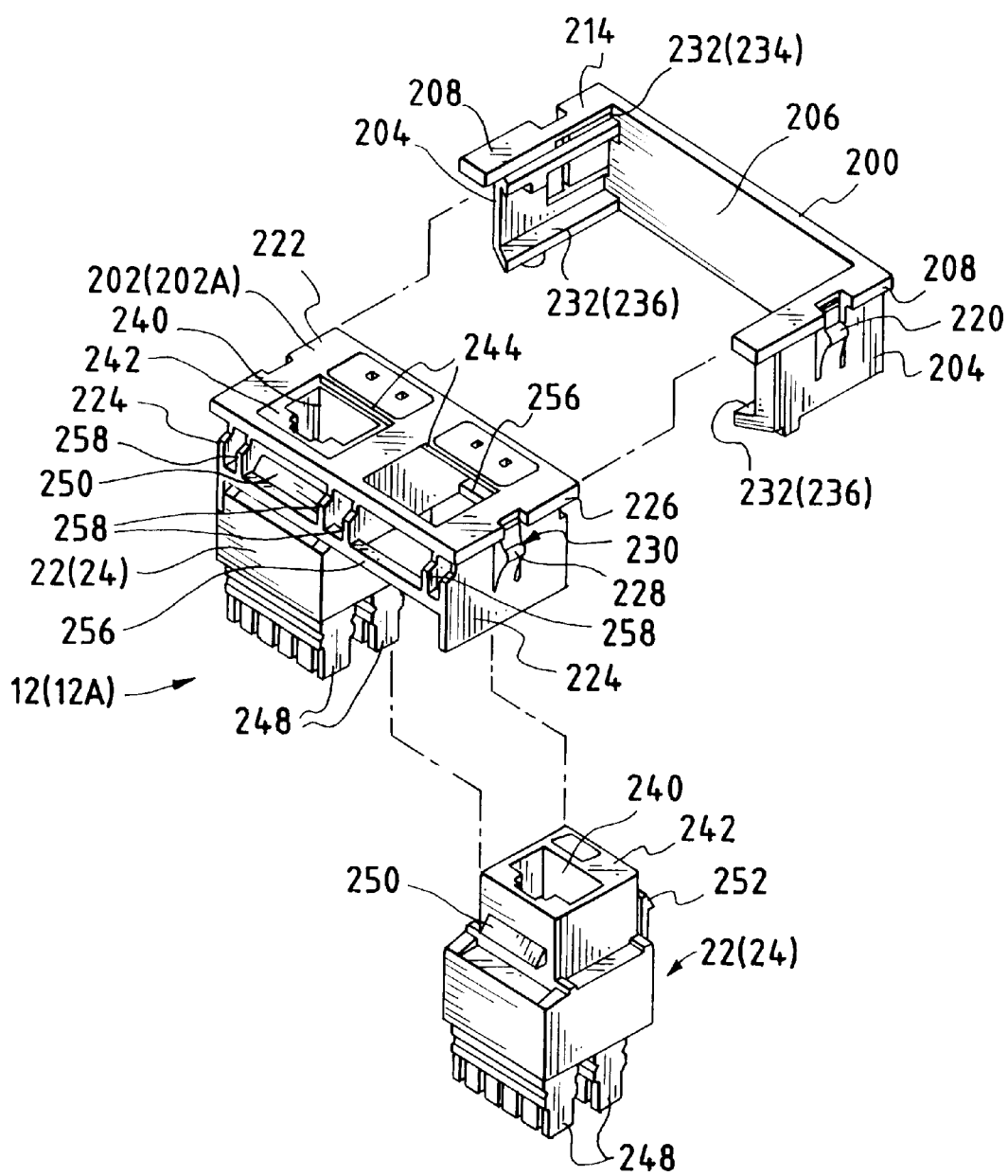
FIG. 4 is an exploded perspective view of a first embodiment of a height adjustable mounting bracket in accordance with the present invention.
Figure 5:
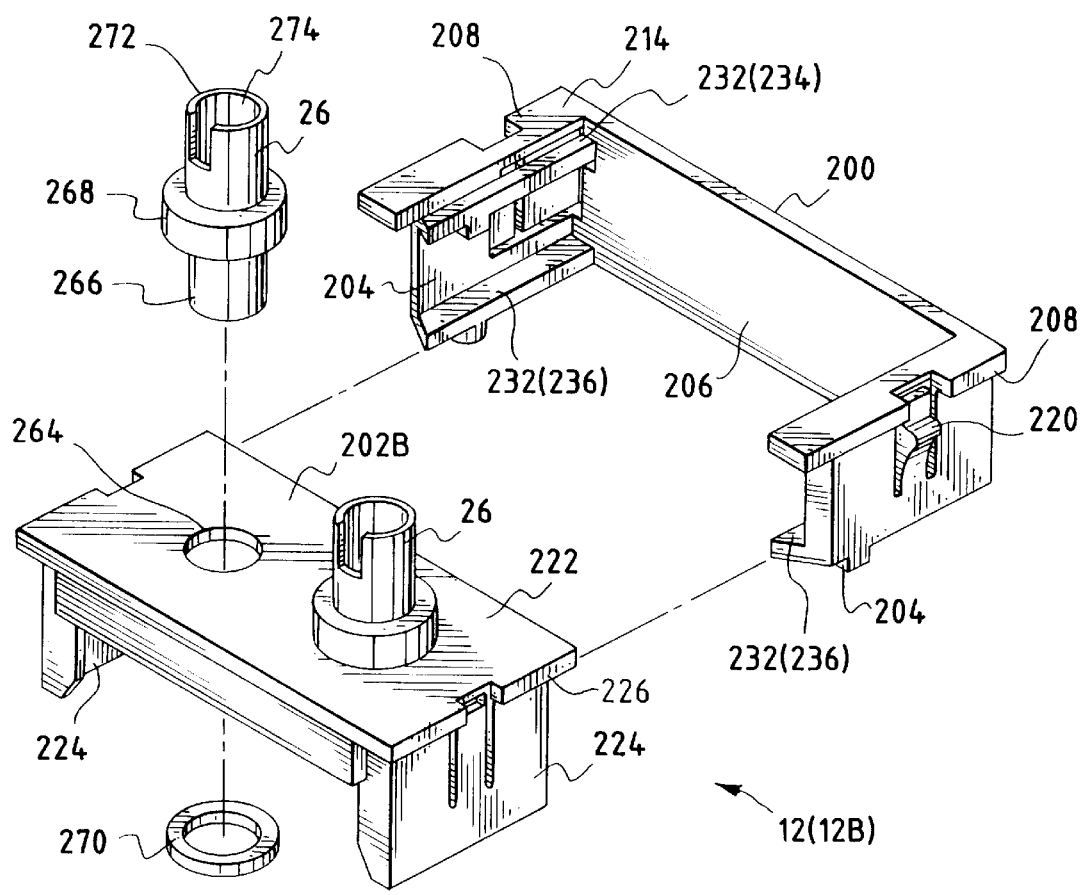
FIG. 5 is an exploded perspective view of a second embodiment of a height adjustable mounting bracket in accordance with the present invention.

Referring additionally to FIGS. 4 and 5, the mounting bracket 12 that is provided for mounting low voltage data jacks within the insert 10 will be described in greater detail. In the preferred embodiment, the fitting includes two mounting brackets 12 (one bracket for each of the side spaces 38). The mounting brackets 12 are height adjustable so that data jacks of varying configurations can be internally mounted in the fitting in a protected fashion. The mounting brackets 12 utilize a two piece construction consisting of a first portion 200 that is mounted in the finish ring 92 (at a fixed height) and a second portion 202 which is height adjustable relative to the bracket first portion.

The bracket first portion 200 is adapted to be mounted within one of the side openings 100 so that the bracket first portion overlies a respective one of the outer spaces 38 of the chamber 30. The bracket first portion 202 is generally U-shaped and includes a pair of opposed side walls 204 and an end wall 206 extending between the side walls. Flanges 208 extend outwardly from the top edges of the side walls 204 and are positioned to overlay the edges of the side opening 100 and engage against the top of the finish ring 92 to support the bracket first portion 200 above the side space 38 of the chamber 30. The top face of the finish ring 92 is recessed as indicated at 212 (see FIG. 2) around the side openings 100 so that the top face 214 of the bracket first portion 200 fits substantially flush with the top face 218 of the annular recess 108, as is shown in FIGS. 1 and 3.

Locking tabs 220 are formed in the side walls 204 of the bracket first portion 200 for securing the mounting bracket 12 within the side opening 100. As the mounting bracket is inserted downwardly into the side opening 100, the lower edges of the tabs 220 engage against the edges of the opening 100. Continued downward pressure on the bracket 12 biases the tabs 220 inwardly, thereby permitting the bracket 12 to move downwardly into the opening 100. The lower edges of the tabs 220 are beveled to ease insertion of the bracket 12 into the opening 100. Once the upper edges of the tabs 12 extend past the lower face of the finish ring 92, the tabs spring outwardly to lock the bracket 12 in place.

The bracket second portion 202 includes a top wall 222 and a pair of downwardly extending side walls 224. The mounting bracket second portion 202 is adapted to receive and support at least one low-voltage service jack 22 such that an upper terminal of the jack is accessible through the cover plate 94 and a lower terminal of the jack 22 is contained within the chamber 30 for interconnection with a service cable.

The bracket second portion 202 is mountable in the bracket first portion 200 in a height adjustable fashion, whereby the top wall 222 of the bracket second portion 202 may be varied relative to the top wall 214 of the bracket first portion. For this purpose, the top wall 222 extends beyond the edges of the side walls 224 to define a pair of outwardly extending flanges or lips 226. Tabs 228 extending outwardly below the flanges 226 and define grooves 230 that are adapted to slidably engage with reciprocal ribs 232 formed on the inner surfaces of the side walls 204 of the bracket first portion 200. In the illustrated embodiments, the bracket first portion 202 includes an upper pair of opposed ribs 234 and a lower pair of opposed ribs 236. When the bracket second portion 202 is slid onto the upper ribs 234, the top wall 222 of the bracket second portion 202 is substantially flush with the top wall 214 of the bracket first portion 200 (see, e.g., the left bracket in FIG. 3). Conversely, when the bracket second portion 202 is slid onto the lower ribs 236, the top wall 222 of the bracket second portion 202 is spaced below the top wall 214 of the bracket first portion 200 (see, e.g., the right bracket in FIG. 3). In either position, an upper terminal of the data jack 22 carried by the bracket 12 is accessible through an associated one of the sliders 116 on the cover plate 94, whereas the lower terminal of the data jack 22 is positioned within the upper compartment 30 (and, more specifically, in one of the side spaces 38) for interconnection to the appropriate service cable. In this manner, data jacks 22 of varying heights can be internally mounted in the fitting 10 in a protected fashion. As will be appreciated, the spacing between the upper and lower ribs 234, 236 is dependent upon the construction of the data jacks 22 that are to be installed in the fitting. Moreover, additional pairs of ribs 232 could be formed on the bracket first portion 200 to accommodate more than two different heights of data jacks 22.

By way of example, the mounting bracket 12A of FIG. 4 is configured to support a pair of RJ-45 Category 5 data jacks 24 in a protected fashion within the fitting 10. When installed, terminals 240 in the top faces 242 of the jacks 24 are accessible through reciprocal openings 244 formed in the top wall 222 of the bracket second portion 202A, whereas the terminal banks 248 in the lower ends of the jacks 24 are contained within the compartment 30 for interconnection with the cable 14. (See FIG. 3). The mounting bracket second portion 202A shown in FIG. 4 is commercially available from Interlink division of the Wiremold Company as a model 2A-U2 KEY connector, and is constructed to support a pair of Keystone data jacks that are also commercially available from Interlink. It will be appreciated, however, that the present invention is not limited to any particular type of data jack. Rather, the bracket second portion 202 can readily be configured to accommodate variety of different commercially available data jacks including other RJ-XX series connectors, (such as the RJ-11 and RJ-12 connectors), fiber optic connectors (see, e.g., FIG. 5), and co-axial connectors.

The jacks 24 (shown in FIG. 4) are configured to snap into place in the bracket second portion 202A. For this purpose each jack 24 includes a pair of outwardly extending locking tabs 250, 252. At least one of the tabs is constructed such that it can be biased inwardly. The jack is installed aligning it below one of the openings 244 in the top wall 222 of the bracket second portion 202A. The jack 24 is then moved upwardly until the top faces of the tabs 250, 252 engage against transverse legs 254 that extend between the side walls 224. Continued upward movement of the jack 24 relative to the bracket second portion 202A biases the tab 252 inwardly. Once the lower edges of the tabs 250, 252 move past the transverse legs 256, the tab 252 snaps back outward to lock the jack 24 into place between the transverse legs 256 and the top wall 222 of the bracket second portion 202A.

Once installed, the top face 242 of the jack 24 fits flush against the bottom face of the top wall 222. Upward movement of the jack 24 is restricted upwardly by the interface between the jack 24 and the top wall 222, whereas downward movement is restricted by the interface between the tabs 250, 252 and the transverse walls 256. The jack 24 is constrained laterally relative to the bracket second portion 202A by walls 258 that extend downwardly from the top wall 222 on either side of the openings 244. Once the jacks 24 are installed into the bracket second portion 202A, the bracket second portion 202A is slid into place on the upper 234 ribs of the bracket first portion 200. The lower terminals 248 of the jacks are then appropriately connected to the service cable 14 and the mounting bracket 12 is installed into place in one of the side openings 100. With the bracket second portion 202A positioned on the upper ribs 234, the top faces 242 of communication jacks 24 fit substantially flush with the top of the recess in the finish ring. The upper terminals 240 of the jacks 24 are accessible through the sliders 116 in the cover plate 94, whereas the lower terminals 248 are contained within the side space 38 of the upper chamber 30.

FIG. 5 illustrates an embodiment 12B of the mounting bracket that is configured to support a pair of fiber optic jacks 26 in a protected fashion within the fitting 12. The only difference from the embodiment 12A of FIG. 4 is the construction of the bracket second portion 202B, and, in particular, the interface between the bracket second portion and the data jack. In this embodiment, the top wall 222 of the bracket second portion 202B includes a pair of generally circular apertures 264 (one shown) that are sized to receive convention fiber optic jacks 26. As will be appreciated, the size and shape of the apertures 264 is dependent on the specific fiber optic jack 26 that is employed. (This embodiment is also well suited for use with co-axial jacks which are mounted to the bracket in a similar fashion.) The fiber optic jack 26 is installed in the bracket second portion 202B by inserting its lower terminal 266 downwardly through the opening until an annular rib 268 formed on the jack abuts against the top wall 222. The jack 26 is secured in place in the opening 264 by a nut 270 that threads onto the lower end of the jack 26. The bracket second portion is then slid into place on the lower ribs 286 of the bracket first portion 200. The lower ribs 236 are positioned such that the upper face 272 of the fiber optic jack 26 is substantially flush with the upper wall 214 of the bracket first portion 200. Hence, when the bracket 12B is installed into the fitting 10, the upper edges of the fiber optic connectors 26 are recessed below the cover plate 94 and aligned substantially flush with the recess 218 in the finish ring 94. The upper terminal 274 of the jack 26 can be accessed through the appropriate slider 116 in the cover plate 94. When the jack 26 is not in use, the slider is closed to protect the jack from dirt, floor traffic, etc. The lower terminal of the jack extends into the inner chamber 30 and is appropriately interconnected with fiber optics service cable 15.

The present invention has been described in the context of two specific data jacks 24, 26. However, it will be appreciated that these are intended as non-limiting examples. Workers skilled in the art will recognize that changes may be made in form and detail without departing from the spirit and scope of the invention.

What is claimed is:

1. In a flush poke-through wiring fitting that is adapted to be supported in a floor opening in a floor of a building structure; that includes an insert having an upper end adjacent to the floor and having a chamber defined therein which extends downwardly from the upper end; that has a fire stopping material disposed in the insert so that the fire rating of the floor, with the floor opening formed in the floor and with the poke-through wiring fitting supported in the floor opening, is substantially the same as the fire rating of the floor without the floor opening formed in the floor; that is adapted to have a source power service cable and a source signal service cable connected with the poke-through wiring fitting, which source power and source signal service cables may be disposed in a plenum below the floor before the floor opening is formed; that has a power receptacle mounted in the chamber so as to be adapted to be connected with the source power service cable and so as to be adapted to have an above floor power connector selectively connected therewith; and that has a top assembly which is connected with the upper end of the insert and which overlies the floor opening and which has an upper, outwardly facing surface, the improvement comprising:

a mounting bracket that is adapted for supporting at least one data jack in the chamber, the mounting bracket comprising:
a bracket first portion mountable in the top assembly; and
a bracket second portion adapted to receive and support the at least one data jack, the second portion being mountable in the first portion in a height adjustable manner, whereby the height of the bracket second portion may be adjusted relative to the bracket first portion to allow data jacks of varying heights to be internally mounted in the fitting in a protected fashion such that the at least one data jack does not extend upwardly beyond the outwardly facing surface of the top assembly and is accessible through the top assembly.

2. In a flush poke-through wiring fitting that is adapted to be supported in a floor opening in a floor of a building structure; that includes an insert having an upper end adjacent to the floor and having a chamber defined therein which extends downwardly from the upper end; that has a fire stopping material disposed in the insert so that the fire rating of the floor, with the floor opening formed in the floor and with the poke-through wiring fitting supported in the floor opening, is substantially the same as the fire rating of the floor without the floor opening formed in the floor; that is adapted to have a source power service cable and a source signal service cable connected with the poke-through wiring fitting, which source power and source signal service cables may be disposed in a plenum below the floor before the floor opening is formed; that has a power receptacle mounted in the chamber so as to be adapted to be connected with the source power service cable and so as to be adapted to have an above floor power connector selectively connected therewith; and that has a top assembly which is connected with the upper end of the insert, which overlies the floor opening and which has an upper, outwardly facing surface, the improvement comprising:

a mounting bracket that is adapted for mounting and supporting at least one data jack in the chamber, the mounting bracket comprising:
a bracket first portion mountable in the top assembly, the first portion having a top surface which is recessed below the outwardly facing surface of the top assembly;
a bracket second portion that is adapted to receive and support at least one data jack, the bracket second portion being selectively mountable in the bracket first portion at a flush mount position at which a top surface of the bracket second portion is substantially flush with the top surface of the bracket first portion and at a recessed position at which the bracket second portion is recessed from the top surface of the bracket first portion by a predetermined amount.

3. The improved poke-through of claim 2, wherein the bracket second portion slidably engages with the bracket first portion.

4. The improved poke-through of claim 2 wherein the second portion is configured to support a fiber optic connector.

5. The improved poke-through fitting of claim 2, wherein the top assembly includes a cover plate having sliders positioned to overlay the at least one data jack carried by the mounting bracket, each slider including a recessed portion configured to receive a label for identifying an underlying data jack.

6. In a flush poke-through wiring fitting that is adapted to be supported in a floor opening in a floor of a building structure; that includes an insert having an upper end adjacent to the floor and having a chamber defined therein which extends downwardly from the upper end; that has a fire stopping material disposed in the insert so that the fire rating of the floor, with the floor opening formed in the floor and with the poke-through wiring fitting supported in the floor opening, is substantially the same as the fire rating of the floor without the floor opening formed in the floor; that is adapted to have a source power service cable and a source signal service cable connected with the poke-through wiring fitting, which source power and source signal service cables may be disposed in a plenum below the floor before the floor opening is formed; that has a power receptacle mounted in the chamber so as to be adapted to be connected with the source power service cable and so as to be adapted to have an above floor power connector selectively connected therewith; and that has a top assembly which is connected with the upper end of the insert and which overlies the floor opening, the improvement comprising:

a mounting bracket adapted to support at least one fiber optic connector in the chamber; with the at least one fiber optics connector having a first end carrying a connection terminal adapted to receive a reciprocal connector and a second end adapted for connection to a fiber optics service cable, the mounting bracket supporting the at least one fiber optics connector such that the second end is contained within the chamber and the first end of the at least one connector is recessed below the top assembly in a protected fashion and is accessible through the top assembly.

7. In a flush poke-through wiring fitting that is adapted to be supported in an opening in a floor of a building stricture; that includes an insert having an upper end adjacent to the floor and having a chamber defined therein which extends downwardly from the upper end; that has a fire stopping material disposed in the insert so that the fire rating of the floor, with the floor opening formed in the floor and with the poke-through wiring fitting supported in the floor opening, is substantially the same as the fire rating of the floor without the floor opening formed in the floor; that is adapted to a source signal service cable connected with the poke-through wiring fitting, which source signal service cables may be disposed in a plenum below the floor before the floor opening is formed; and that has a top assembly which is connected with the upper end of the insert, which overlies the floor opening and which has an upper, outwardly facing surface, the improvement comprising:

a mounting bracket adapted to support at least one data jack in the chamber, the mounting bracket being height adjustable relative to the top assembly such that data jacks of varying heights can be internally mounted in the fitting in a protected fashion wherein the at least one data jack does not extend upwardly beyond the outwardly facing surface of the top assembly.

8. The improved poke-through fitting of claim 7, wherein the mounting bracket comprises:

a bracket first portion mountable in the top assembly, the first portion having a top surface which is recessed below the outwardly facing surface of the top assembly; and a bracket second portion that is adapted to receive and support at least one data jack, the bracket second portion being selectively mountable in the bracket first portion at a flush mount position at which a top surface of the bracket second portion is substantially flush with the top surface of the bracket first portion and at a recessed position at which the bracket second portion is recessed from the top surface of the bracket first portion by a predetermined amount.

9. The improved poke-through fitting of claim 8, wherein the bracket second portion slidably engages with the bracket first portion.

10. The improved poke-through fitting of claim 8, wherein the bracket second portion is configured to support a fiber optic connector.

11. A flush poke-through wiring fitting that is adapted to be supported in an opening in a floor of a building structure, the poke-through fitting comprising:

an insert having an upper end adjacent to the floor and having a chamber defined therein which extends downwardly from the upper end;

a fire stopping material disposed in the insert so that the fire rating of the floor, with the floor opening formed in the floor and with the poke-through wiring fitting supported in the floor opening, is substantially the same as the fire rating of the floor without the floor opening formed in the floor;

a top assembly which is connected with the upper end of the insert, which overlies the floor opening and which has an upper, outwardly facing surface; and means for internally mounting data jacks of varying heights fitting in a protected fashion wherein the data jack does not extend upwardly beyond the outwardly facing surface of the top assembly.

12. The improved poke-through fitting of claim 11, wherein the means comprises a mounting bracket adapted to support at least one data jack in the chamber, the mounting bracket being height adjustable relative to the top assembly such that data jacks of varying heights can be internally mounted in the fitting in a protected fashion wherein the at least one data jack does not extend upwardly beyond the outwardly facing surface of the top assembly.

* * * * *